*United States Patent* [19]

Owen, III et al.

[11] Patent Number: 5,781,597
[45] Date of Patent: Jul. 14, 1998

[54] SYNCHRONOUS DIGITAL TRANSMISSION SYSTEM HAVING JUSTIFICATION CIRCUIT THAT COUNTS FRAME BYTES, CALCULATES OFFSETS, COMPARES THRESHOLDS, AND INITIATES JUSTIFICATION ACTION

[75] Inventors: Henry W. L. Owen, III, Smyrna, Ga.; Peter E. Sholander, North Merrick, N.Y.

[73] Assignee: Alcatel SEL Aktiengesellschaft, Stuttgart, Germany

[21] Appl. No.: 389,308

[22] Filed: Feb. 16, 1995

[51] Int. Cl.$^6$ .................... H04J 3/07; H04L 7/00
[52] U.S. Cl. ............. 375/372; 375/363; 370/506
[58] Field of Search ................... 375/354, 356, 375/363, 371, 373, 375, 372, 374; 370/503, 505, 506, 516, 907

[56] References Cited

U.S. PATENT DOCUMENTS

| 5,172,376 | 12/1992 | Chopping et al. | 370/509 |
| 5,343,476 | 8/1994 | Urbansky | 370/506 |
| 5,457,717 | 10/1995 | Bellamy | 375/372 |

OTHER PUBLICATIONS

"Jitter Reduction for Asynchronous Network Application of Synchronous Digital Hierachy" by Yoshinori Rokugo, Electronics & Communications in Japan, Part 1, vol. 76, No. 5, 1993.

"Methodology and Results of Synchronous Digital Hierarchy Network Payload Jitter Simulation" by Peter Sholander, Henry L. Owen, Simulation, Jan. 1995, pp. 34–41.

"Synchronous digital hierarchy network pointer simulation" by Henry Owen, Thomas M. Klett, Computer Networks and ISDN Systems 26 (1994) 481–491.

*Primary Examiner*—Chi H. Pham
*Assistant Examiner*—William Luther
*Attorney, Agent, or Firm*—Ware, Fressola, Van Der Sluys & Adolphson LLP

[57] ABSTRACT

A synchronous digital transmission system has network nodes each operating at a respective fixed internal clock rate, each with a justification device for adapting an incoming signal to the respective fixed internal clock rate thereof by positive or negative justification actions, and for controlling a memory device which stores payload bytes of a frame of the incoming signal and outputs the payload bytes at the internal clock rate of a respective network node. The justification device has a first circuit (10) for counting incoming/outgoing frame bytes and calculating at sampling instants ($T_i$) a difference value ($\Delta_i$) and a change ($\Delta_i - \Delta_{i-1}$) in the difference value ($\Delta_i$), has a second circuit (20) for calculating a control value (OFFSET) which is dependent on the change ($\Delta_i - \Delta_{i-1}$) in the difference value ($\Delta_i$) and on a correction factor (LEAK), and has a third circuit (30) for comparing at the sampling instants ($T_i$) the control value (OFFSET) with an upper threshold (U_THRESH) and a lower threshold (L_THRESH), and for initiating either a positive or negative justification action respectively if the control value (OFFSET) is either less than the lower threshold (L_THRESH) or greater than the upper threshold (U_THRESH).

9 Claims, 10 Drawing Sheets

SYNCHRONOUS DIGITAL TRANSMISSION SYSTEM HAVING JUSTIFICATION CIRCUIT THAT COUNTS FRAME BYTES, CALCULATES OFFSETS, COMPARES THRESHOLDS, AND INITIATES JUSTIFICATION ACTION

TECHNICAL FIELD

The present invention relates to a synchronous digital transmission system having a number of network nodes each operating at a fixed internal clock rate, a justification device in each network node for adapting an incoming signal to the internal clock rate of the network node by positive or negative justification actions, and at least one memory device in each network node which, under control of the justification device, stores payload bytes of a frame of the incoming signal and outputs the payload bytes at the internal clock rate of the network node. The invention also relates to a method of initiating justification actions in a synchronous digital transmission system wherein positive or negative justification actions are initiated by at least one justification device contained in a network node, wherein payload bytes of a frame of an incoming signal are stored in a memory device at a clock rate of a preceding network node, and wherein the payload bytes are output from the memory device at an internal clock rate of the network node, so that a signal transmitted by the network node has the internal clock rate of the network node. It further relates to a justification device for a network node contained in a synchronous digital transmission system, the justification device adapting an incoming signal to an internal clock rate of the network node by positive or negative justification actions, so that a signal transmitted by the network node has the internal clock rate of the network node.

BACKGROUND OF THE INVENTION

A synchronous digital transmission system is, for example, the Synchronous Digital Hierarchy (SDH) system. In such a transmission system, signals to be transmitted are combined according to a particular pattern and organized in a frame structure. In SDH, such a frame is referred to as a synchronous transport module STM-N; it is described, for example, in ITU Recommendations G.707, G.708, and G.709. The frame consists of 270 Columns and 9 rows. Each column of a row contains one byte. In rows 1 to 3 and 5 to 9, columns 1 to 9 contain the so-called section overhead (SOH) for control and error-detection information. The fourth row of columns 1 to 9 contains an administrative unit (AU) pointer referred to as an "AU pointer". The remaining columns and rows contain the information payload. An STM-1 payload is contained, for example, in a virtual container VC-4, which consists of an information payload field and a path overhead (POH) information field.

Further units defined in SDH are, for example, administrative units, such as AU-4, which consist of a virtual container VC and an AU pointer, and tributary units such as TU-12, which consist of a virtual container and a TU pointer.

STM-N signals are transmitted over a transmission link which at given intervals, e.g., at network nodes, contains circuits in which an incoming STM-N signal is adapted to a local (internal) standardized clock of the network node. These circuits perform a clock alignment by a conventional byte justification procedure. At predetermined locations of the frame (per ITU recommendation G.709), justificationw bytes are inserted if required. In the case of a positive justification action, the payload is omitted at the stuff location, and in the case of a negative justification action, the payload is inserted at the stuff location. A justification action is also called "pointer action".

An investigation of these pointer actions based on a model of an SDH transmission system is known from Henry L. Owen and Thomas M. Klett, "Synchronous digital hierarchy network pointer simulation", Computer Networks and ISDN Systems 26, 1994, pages 481 to 491. The model shown there in FIG. 3 consists of a number of network nodes 1, . . . , N−1. Signals (telephone, video, computer signals) are introduced into the network at node 1 and are combined into SDH signals by means of a mapper (synchronizer). Each network node N has an internal clock. A model of a network node N is shown in FIG. 5 of that article. A frame of an input signal is presented to an elastic memory (first-in, first-out, FIFO) at the clock rate of the preceding network node N-1. The bytes are written into the memory at this clock rate and are read from the memory at the clock rate of network node N. The type of byte presently being input to the memory, i.e., whether it is a payload byte or an overhead byte, determines if that particular byte should be written into the memory. In the case of an AU-4, all payload bytes are written into the same memory, and in other cases, there are different memories for different types of payload bytes. The number of bytes in the memory determines when the memory is too full or too empty. With the aid of defined upper and lower thresholds, pointer actions are initiated which are controlled by a justification device which is called a pointer request generator, or a pointer processor. During these pointer actions, harmful effects may occur, which are described, for example, in Henry L. Owen and Peter E. Sholander, "Methodology and Results of Synchronous Digital Hierarchy Network Payload Jitter Simulation", SIMULATION, January 1995, pages 34 to 41. These effects include the 87/3 effect and the 35/1 effect. These effects occur when a network node is in a holdover mode after failure of an external synchronization source and when a justification device derives the pointer actions from the filling level of a memory. In holdover mode, the node clock may vary by up to ±4.6 ppm.

For the 87/3 effect this means that (due to the STM-1 frame structure) in its simplest manifestation there are 87 regularly spaced pointer actions with average spacing D followed by a gap of 4D where there are no pointer actions. This gap equates to 3 missing pointers, hence the name 87/3 effect.

The corresponding effect for a TU-12 is the 35/1 effect. The corresponding effect for a TU-11 is the 26/1 effect. The corresponding effect for a TU-3 is the 85/3+2 effect.

SUMMARY OF THE INVENTION

It is an object of the invention to provide a synchronous digital hierarchy transmission system in which the aforementioned deleterious gap effects do not occur. A transmission system by which this object is attained is one where a justification device has first means (10) for counting incoming and outgoing frame bytes and calculating therefrom, at sampling instants ($T_i$), a difference value ($\Delta_i$) and a change ($\Delta_i - \Delta_{i-1}$) in the difference value ($\Delta_i$), wherein the justification device has second means (20) for calculating a control value (OFFSET) which is dependent on the change ($\Delta_i - \Delta_{i-1}$) in the difference value ($\Delta_i$) and on a correction factor (LEAK), and wherein the justification device has third means (30) for comparing, at the sampling instants ($T_i$), the control value (OFFSET) with an upper threshold (U_THRESH) and a lower threshold (L_THRESH) for initiating a positive justification action if the control value (OFFSET) is less than the lower threshold (L_THRESH), and for initiating a negative justification action if the control value (OFFSET) is greater than the upper threshold (U_THRESH). It is another object of the invention to provide a justification device for transmission systems. A justification device by which this object is attained is one that has first means (10) for counting frame bytes of the incoming signal and frame bytes of the transmitted signal and for calculating therefrom, at sampling instants ($T_i$), a difference value ($\Delta_i$) and a change ($\Delta_i - \Delta_{i-1}$) in the difference value ($\Delta_i$), wherein the justification device has second means (20) for calculating a control value (OFFSET) which is dependent on the change ($\Delta_i - \Delta_{i-1}$) in the difference value ($\Delta_i$) and on a correction factor (LEAK), and wherein the justification device has third means (30) for comparing, at the sampling instants ($T_i$), the control value (OFFSET) with an upper threshold (U_THRESH) and a lower threshold (L_THRESH), for initiating a positive justification action if the control value (OFFSET) is less than the lower threshold (L_THRESH), and for initiating a negative justification action if the control value (OFFSET) is greater than the upper threshold (U_THRESH). It is a further object of the invention to provide a method of initiating justification actions for a transmission system as claimed in claim 1 and for a justification device. A method by which this object is attained is where the frame bytes of the incoming signal and the frame bytes of the transmitted signal are counted by first means (10) to calculate therefrom, at sampling instants ($T_i$), a difference value ($\Delta_i$) and a change ($\Delta_i - \Delta_{i-1}$) in the difference value ($\Delta_i$), that a control value (OFFSET) which is dependent on the change ($\Delta_i - \Delta_{i-1}$) in the difference value ($\Delta_i$) and on a correction factor (LEAK) is calculated by a second means (20), and that at the sampling instants ($T_i$), the control value (OFFSET) is compared by a third means (30) with an upper threshold (U_THRESH) and a lower threshold (L_THRESH) so as to initiate a positive justification action if the control value (OFFSET) is less than the lower theshold (L_THRESH), and to initiate a negative justification action if the control value (OFFSET) is greater than the upper threshold (U_THRESH).

BRIEF DESCRIPTION OF THE DRAWINGS

The invention will now be explained in more detail, by way of example, with reference to the accompanying drawings, in which.

BEST MODE FOR CARRYING OUT THE INVENTION

According to the basic idea of the invention, frame bytes of an incoming signal and frame bytes of an outgoing signal are counted to calculate therefrom, at sampling instants, a difference value and a change in this difference value. The control value thus determined is compared, at given sampling instants, with an upper threshold and a lower threshold. If the control value is less than the lower threshold, a positive justification action will be initiated. If the control value is greater than the upper threshold, a negative justification action will be initiated.

As a consequence of a justification action, the threshold values can be increased or decreased by a constant value, or the control value can be changed by a constant value.

Figure 1:
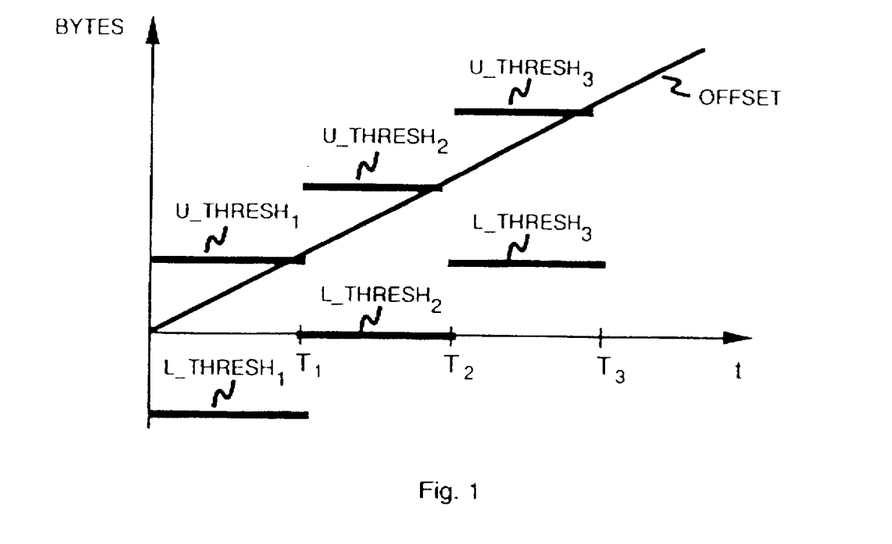
FIG. 1 shows a first diagram to explain the method of initiating justification actions.
Figure 2:
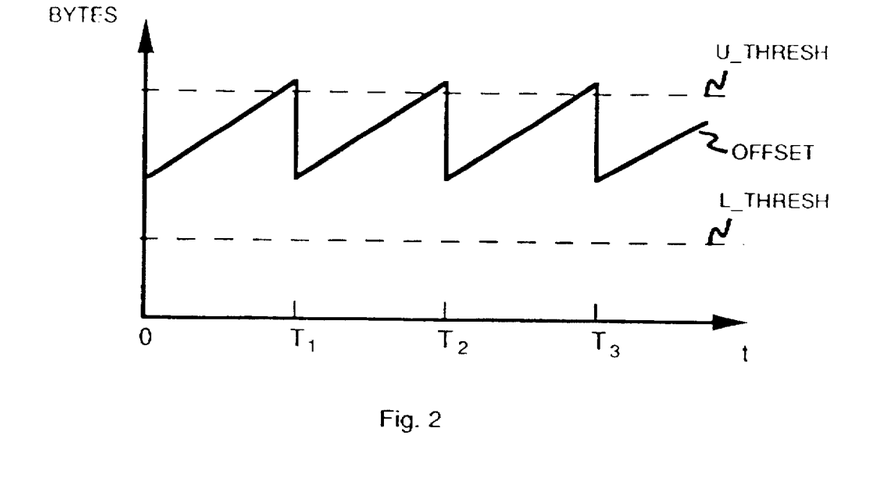
FIG. 2 shows a second diagram to explain the method of initiating justification actions.

Diagrams to explain this basic idea are shown in FIGS. 1 and 2. In both figures, the control value OFFSET is plotted as a function of time t.

In FIG. 1, the control value OFFSET has been drawn, by way of example, as a straight line stating at the origin. Also shown are upper thresholds U_THRESH (i=1, 2, 3) and lower thresholds L_THRESH (i=1, 2, 3) in the form of horizontal lines. To be comparable, the thresholds U_THRESH$_i$, L_THRESH$_i$, and the control value OFFSET correspond to a number of bytes. At a first sampling instant $T_i$, the control value OFFSET is greater than the first upper threshold U_THRESH$_1$, which results in a negative justification action being initiated and the thresholds U_THRESH$_1$, L_THRESH$_1$, being increased by a constant value to form the second thresholds U_THRESH$_2$, L_THRESH$_2$. At a second sampling instant $T_2$, a negative justification action is initiated, and the thresholds U_THRESH$_2$, L_THRESH$_2$ are increased by the constant factor to obtain the third thresholds U_THRESH$_3$, L_THRESH$_3$. The magnitude of the constant value (THRESHOLD FACTOR) will be dealt with later.

In FIG. 2, the thresholds U_THRESH, L_THRESH are constant. Here, the control value OFFSET is changed by a constant value; it has the same slope as in FIG. 1. At the first sampling instant $T_1$, the control value OFFSET is greater than the upper threshold U_THRESH, whereby a negative justification action is initiated. As a result of this, the control value OFFSET is decreased by the constant value. At the second sampling instant $T_2$, the control value OFFSET is again greater than the upper threshold U_THRESH, whereby a negative justification action is initiated. Also at the third sampling instant $T_3$, the control value OFFSET is once again greater than the upper threshold U_THRESH, so that a negative justification action is initiated again, and the control value OFFSET is decreased by the constant value.

Diagrams corresponding to those of FIGS. 1 and 2 could also be created for positive justification actions to explain the basic idea of the invention. A positive justification action results if at a sampling instant $T_i$ the control value OFFSET is less than the lower threshold L_THRESH. In that case, the thresholds U_THRESH, L_THRESH, are decreased by a constant value. If constant thresholds U_THRESH, L_THRESH are used, the control value OFFSET can than be increased by the constant value.

The structure of the justification device will now be described with the aid of FIGS. 3 to 11. This will be followed by a description of the operation of the justification device.

Figure 3:
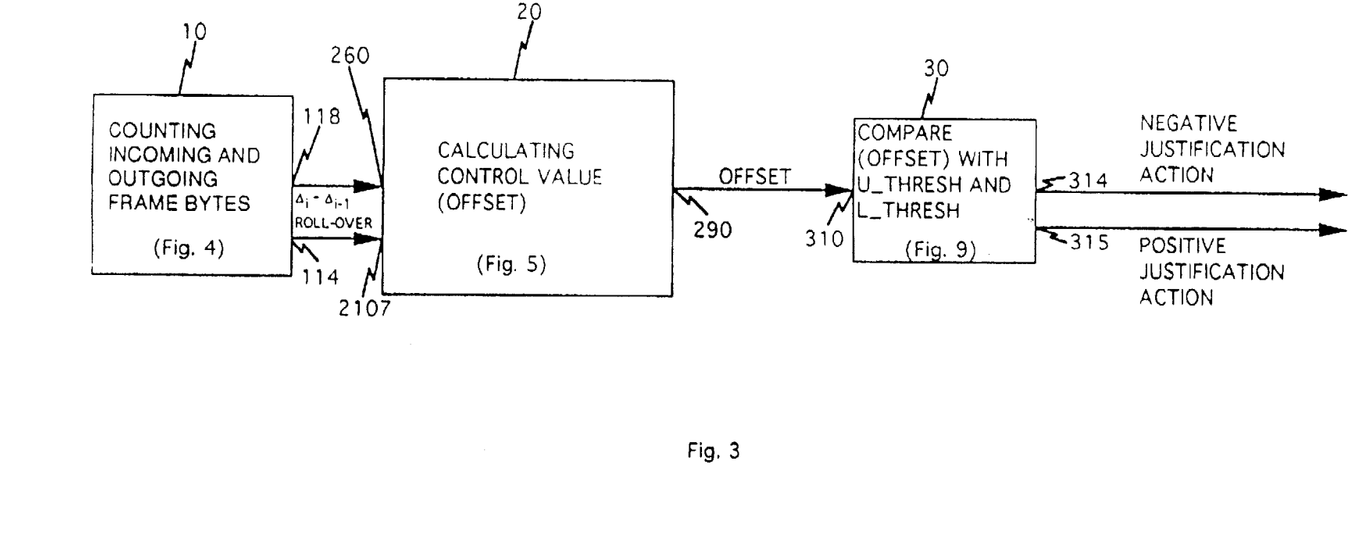
FIG. 3 shows a justification device consisting of three blocks (10, 20, 30)
Figure 4:
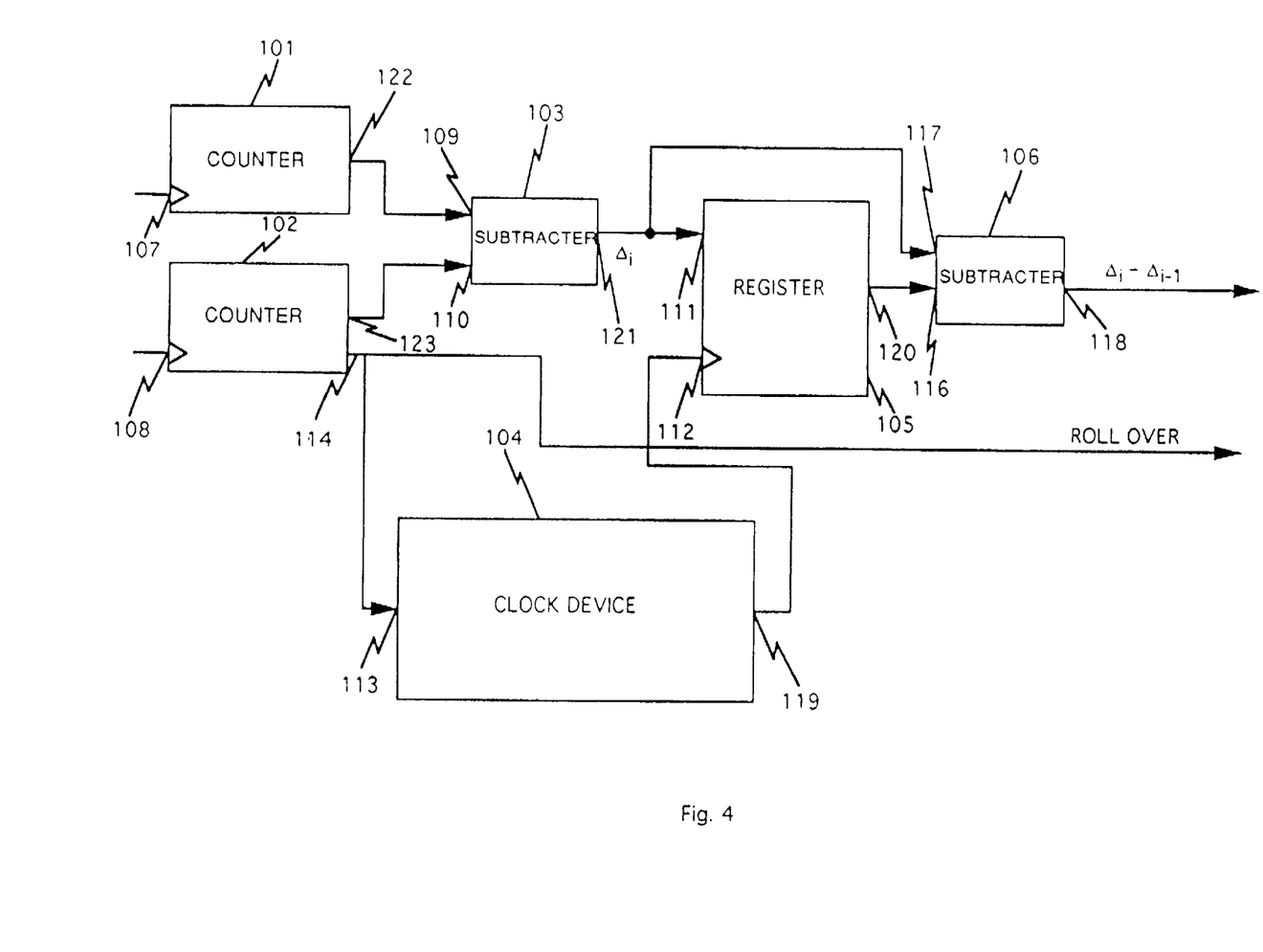
FIG. 4 is a more detailed representation of the first block (10) of FIG. 3.

FIG. 3 shows a justification device consisting of three blocks 10, 20, 30. The first block 10 is a device which calculates a change $\Delta_i-\Delta_{i-1}$ in a difference value $\Delta_i$ between a frame byte to be stored and a frame byte to be read. This change $\Delta_{i-1}$ in the difference value $\Delta_i$ is delivered at an output 118. A further output 114 provides an overflow indicator ROLL-OVER. Details of this block 10 are shown in FIG. 4.

The second block 20 is a device for calculating the control value OFFSET, which is dependent on the change $\Delta_i-\Delta_{i-1}$ in the difference value $\Delta_i$ and on a correction factor LEAK, which is also calculated in the second block 20. The control value OFFSET leaves the second block 20 at an output 290. An input 260 of the second block 20, which is connected to the output 118 of the first block 10, is supplied with the change $\Delta_i-\Delta_{i-1}$ in the difference value $\Delta_i$, and an input 2107 of the second block 20, which is connected to the output 114 of the first block 10, is supplied with the overflow indicator ROLL-OVER. Details of the second block are shown in FIGS. 5, 6, 7, and 8.

The third block 30 is a device which compares the control value OFFSET with the two thresholds U_THRESH, L_THRESH at given sampling instants $T_j$, and initiates a positive justification if the control value OFFSET is less than the lower threshold L_THRESH, and a negative justification action if the control value OFFSET is greater than the upper threshold U_THRESH.

Figure 9:
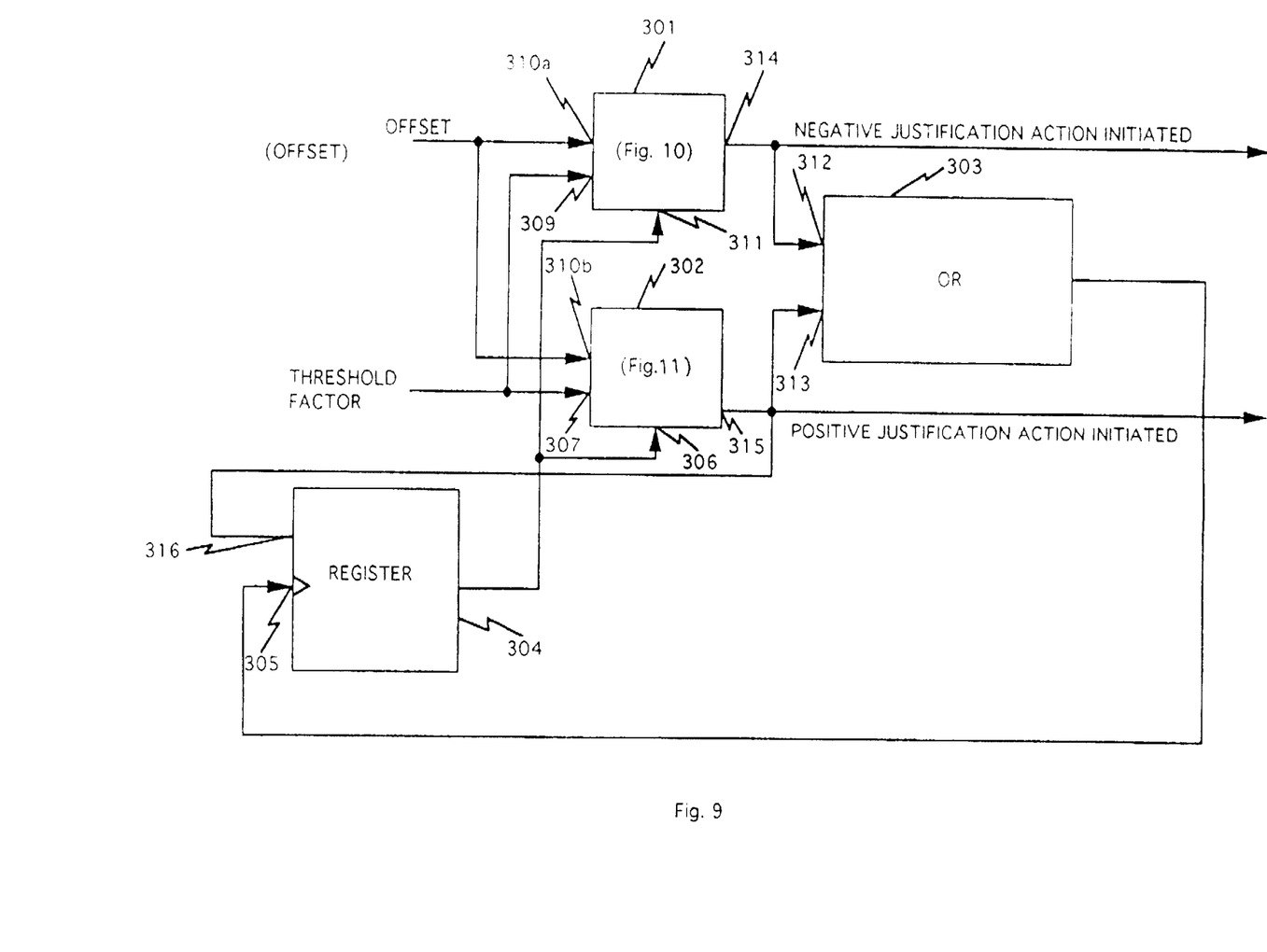
FIG. 9 is a more detailed representation of the third block (30)
Figure 10:
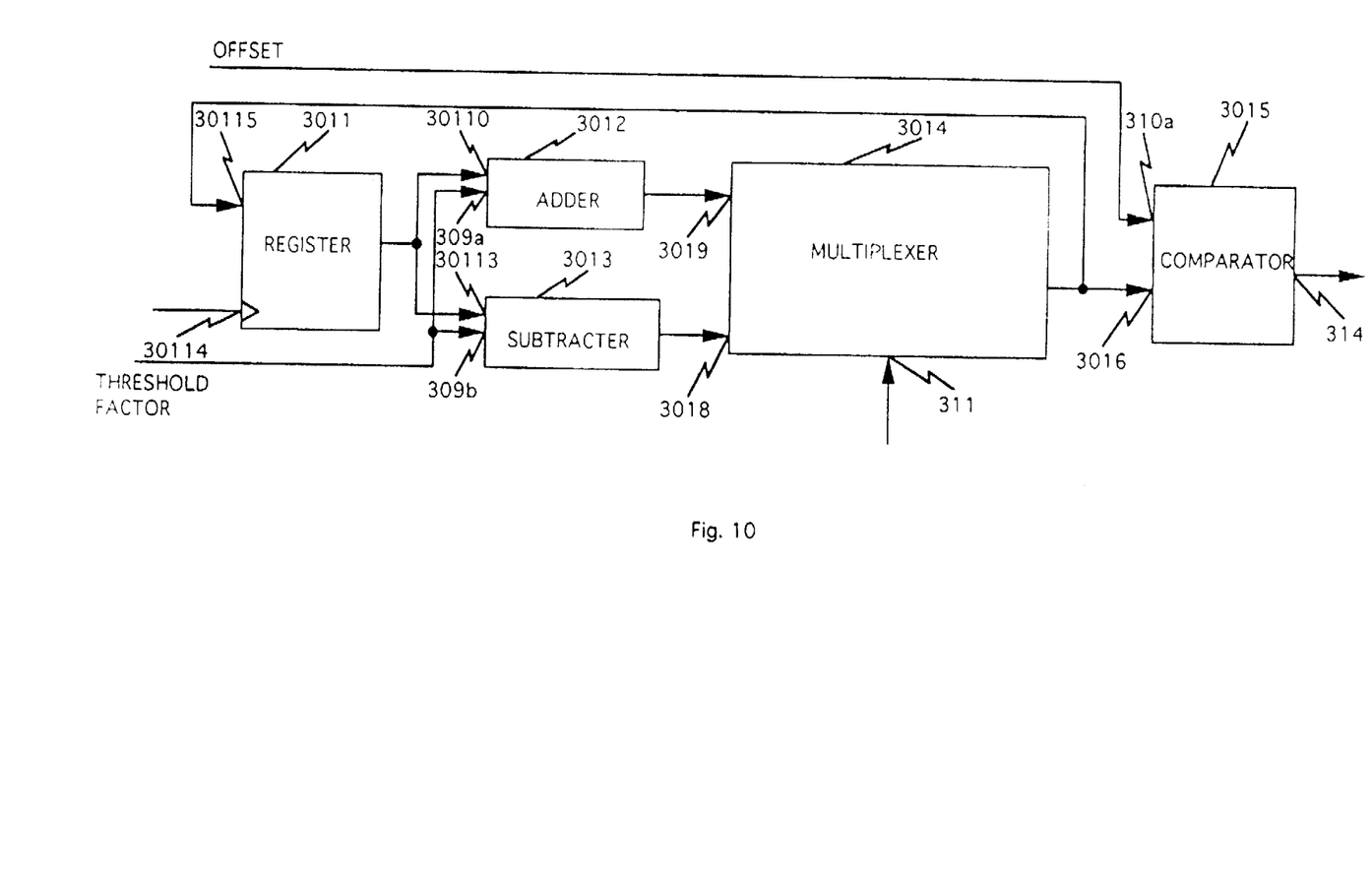
FIG. 10 shows a first comparator contained in the third block (30)
Figure 11:
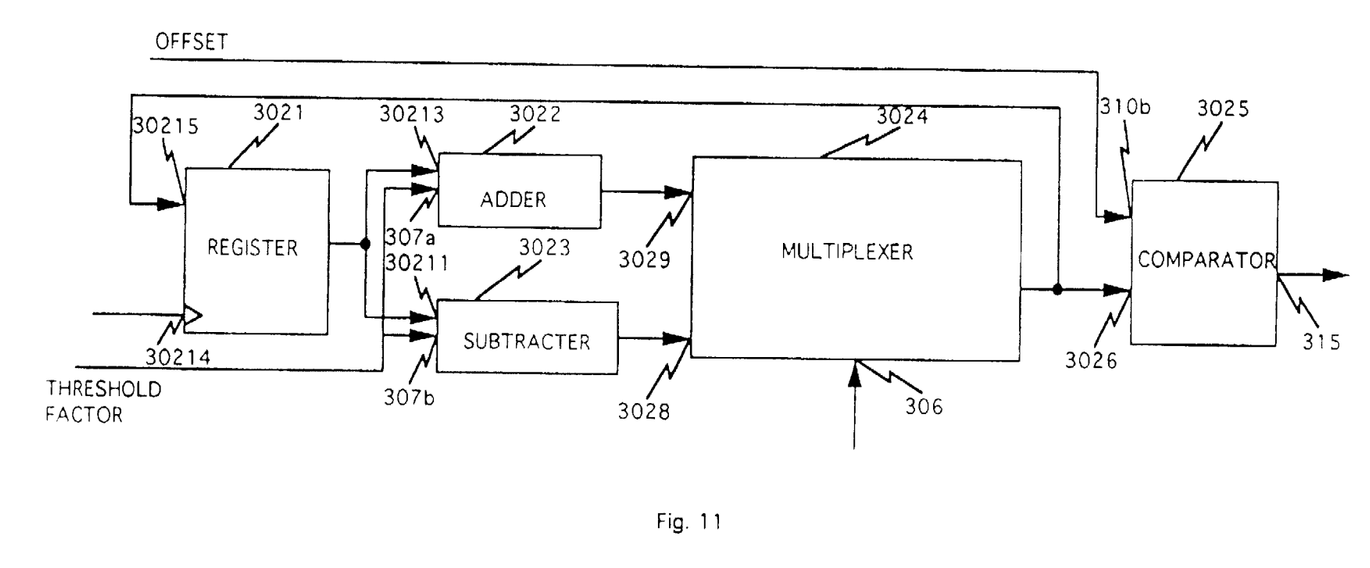
FIG. 11 shows a second comparator contained in the third block (30).

An input 310 connected to the output 290 of the second block 20 is supplied with the control value OFFSET. Outputs 314, 315 of the second block 20 are coupled to a frame module (not shown) which forms the frames, taking account of the positive and negative justification actions. Details of the third block 30 are shown in FIGS. 9, 10, and 11.

FIG. 4, as mentioned above, shows the first block 10 in greater detail. A counter 101 counts the frame bytes coming from a preceding network node N-1, which are to be written into a memory device. On each pulse of a clock from the preceding network node N-1, which is derived from the incomiing STM-1 signal and applied to a clock input 107, the counter 101 is incremented by one count. Since the frame of an STM-1 signal contains 2430 bytes, the counter 101 counts modulo 2430, i.e., as soon as 2429 frame bytes have been counted, the counter 101 begins to count from zero again. An output 122 of the counter 101 is coupled to an input 109 of a subtracter 103.

Another counter 102 counts frame bytes which are read from the memory to form a new frame. This counter 102 is supplied with the internal clock of network node N via a clock input 108, and it is also incremented by one count on each clock pulse and counts modulo 2430. An output 123 of the counter 102 is coupled to a further input 110 of the subtracter 103, which compares the counts of the two counters 101, 102 (modulo 2430). At the sampling instant $T_i$ an output 121 of the subtracter 103 delivers an (instantaneous) difference value $\Delta_i$, which is fed to an input 111 of a register 105 and to an input 117 of a further subtracter 106 (modulo 2430). The register 105 stores the (instantaneous) difference value $\Delta_i$ until a clock pulse is applied to an input 112. Then the stored and delayed difference value $\Delta_{i-1}$ appears at an output 120 of the register 105 and is supplied to a further input 116 of the subtracter 106. This subtracter 106 forms the change $\Delta_i-\Delta_{i-1}$ in the difference value $\Delta_i$, which is delivered at an output 118.

The clock pulse for the register 105 is generated by a clock device 104. An input 113 of this clock device 104 is connected to an output 114 of the counter 102, and an output 119 of the clock device 104 is coupled to the input 112 of the register 105. This clock device 104 determines an instant (instant of triggering) which is dependent on the STM-1 signal: If an STM-1 signal with a TU-3 is present, a sample is taken after every fourth frame, and if an STM-1 signal with a TU-11 or TU-12 is present, a sample is taken after every 16th frame.

The output 114 of the counter 102 provides the overflow indicator ROLL-OVER, which indicates when the counter has exceeded the value 2429. After each frame (2430 bytes), therefore, the overflow indicator ROLL-OVER is in the 1 state.

Figure 5:
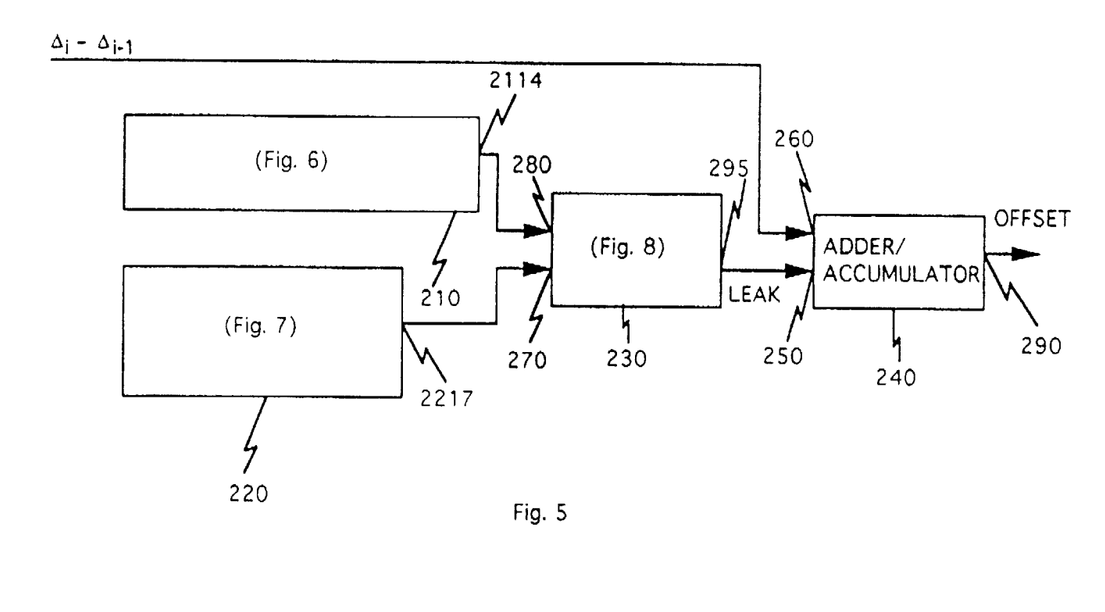
FIG. 5 is a more detailed representation of the second block (20) of FIG. 3.

FIG. 5 shows the second block 20 (FIG. 3) in greater detail. The output 118 of the subtracter 106 (see FIG. 4) is coupled to an input 260 of an adder/accumulator 240 ( modulo 2430). From the correction factor LEAK, which is fed to the adder/accumulator 240 via an input 250, and the change $\Delta_i-\Delta_{i-1}$ in the difference value $\Delta_i$ (input 260), the adder/accumulator 240 forms the control value OFFSET at the instant $T_j$. The control value is delivered at the output 290 of the second block 20.

Further facilities shown in FIG. 5 are:

A facility 210 for counting the number of frames between the last K incoming pointer actions. An output 2114 provides the number of frames $\Sigma F$. Details of this facility 210 are illustrated in FIG. 6.

Figure 7:
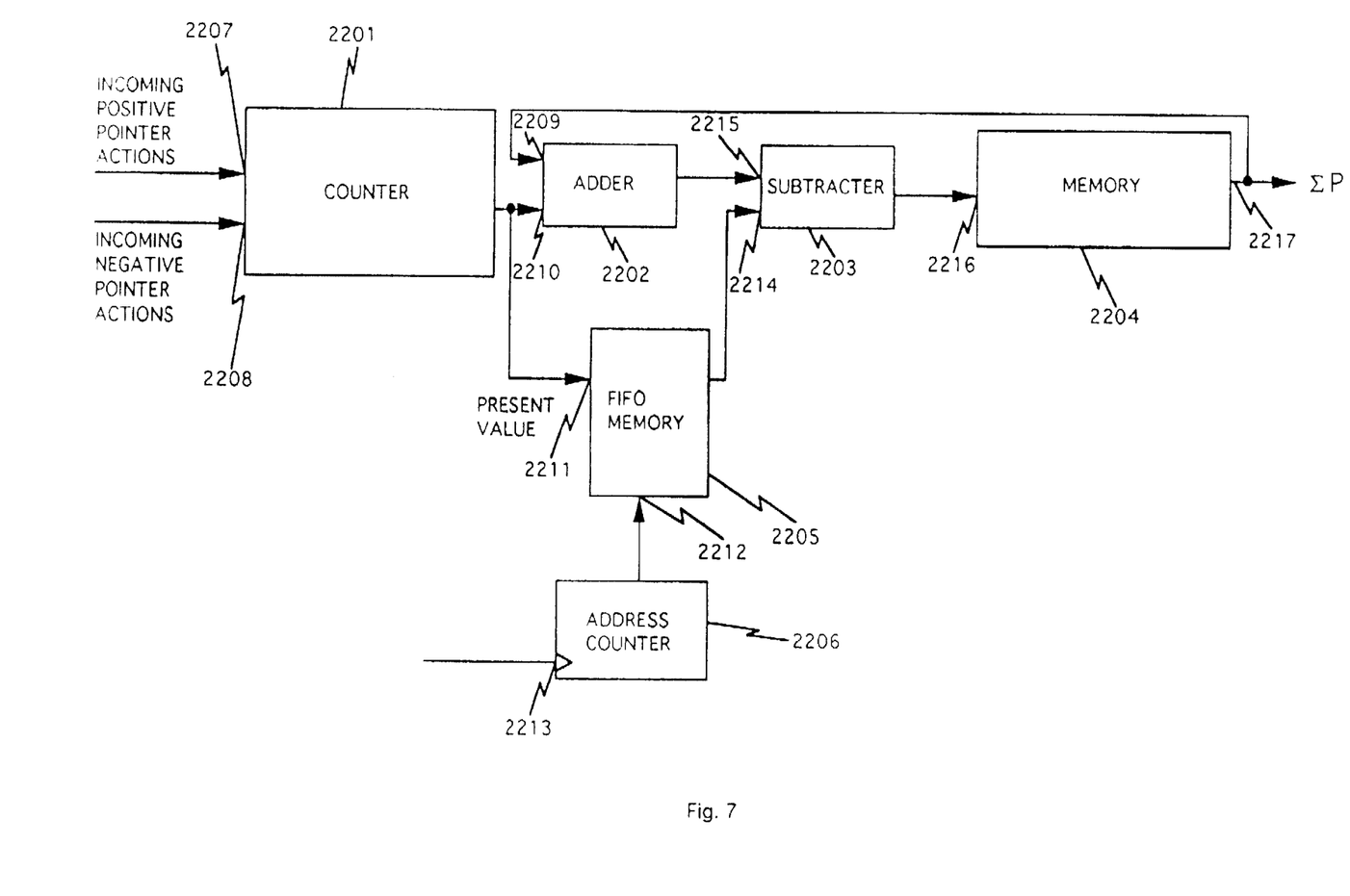
FIG. 7 shows a second counting facility contained in the second block (20)

A facility 220 for counting the number and type (positive or negative) of the last K incoming pointer actions. An output 2217 provides the sum of the pointer actions, $\Sigma P$. Details of this facility 220 are illustrated in FIG. 7.

Figure 8:
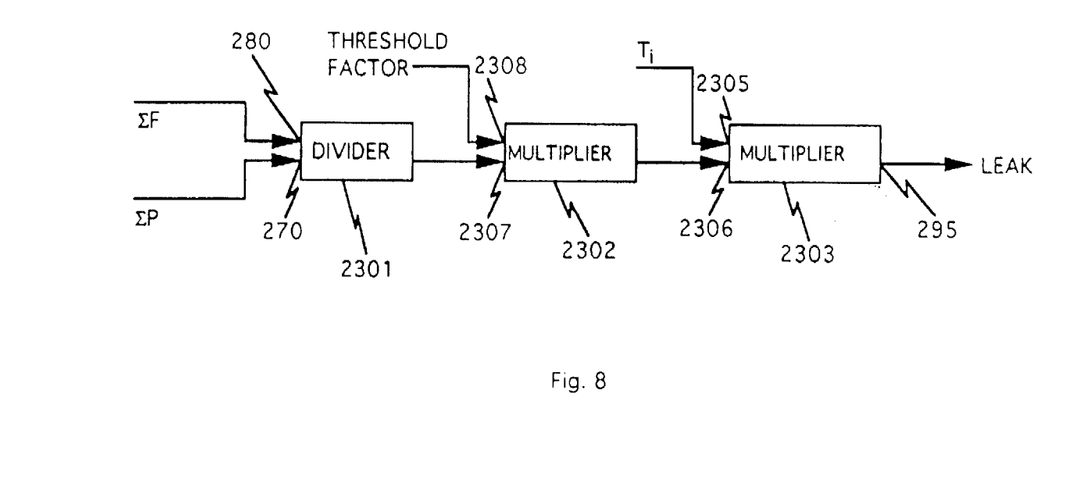
FIG. 8 shows a facility contained in the second block (20) for calculating a correction factor (LEAK)

A facility 230 for calculating the correction factor LEAK, which has an input 280 connected to the output 2114, an input 270 connected to the output 2217, and an output 295 coupled to the input 250. Details of this facility 230 are illustrated in FIG. 8.

Figure 6:
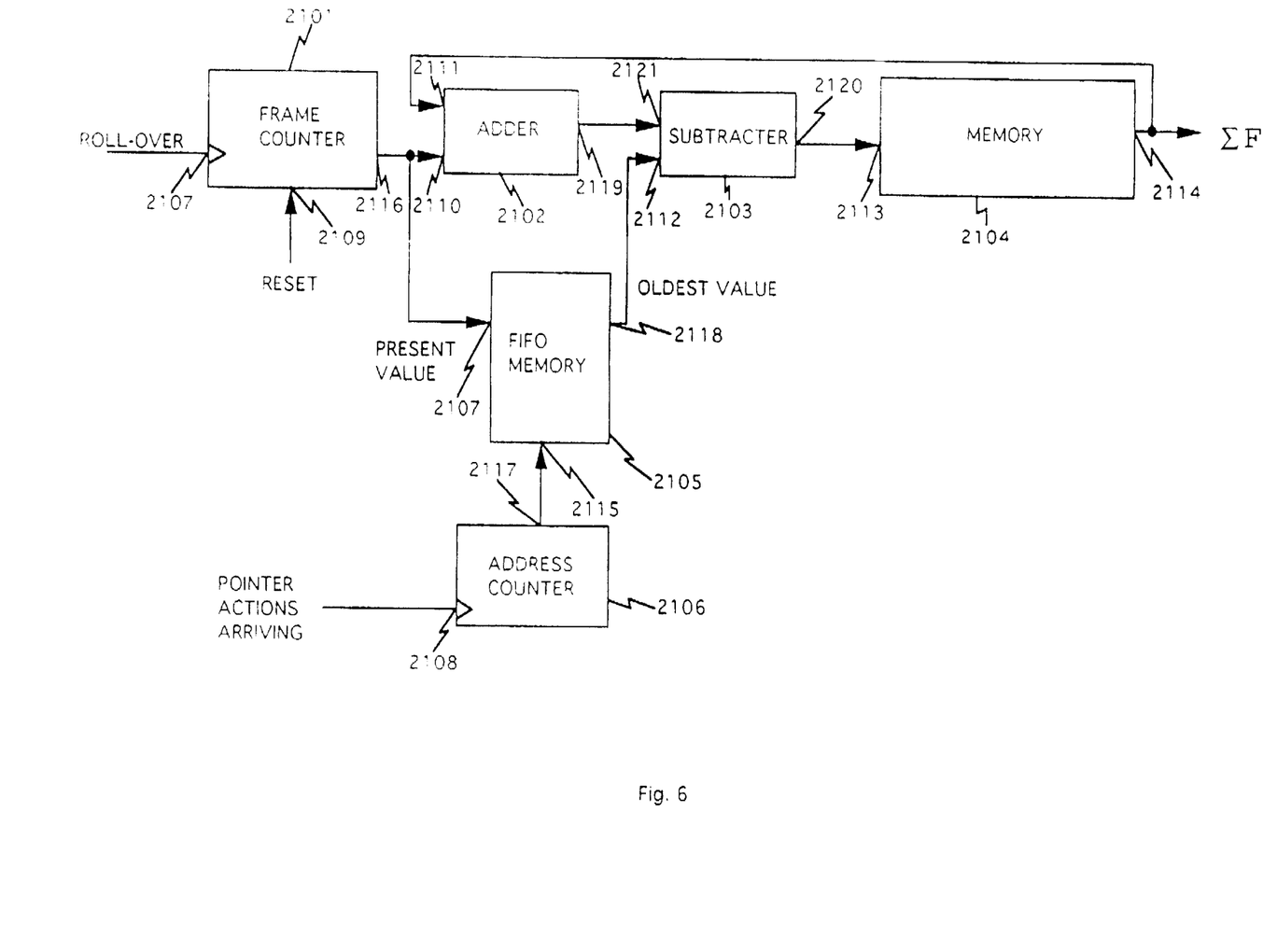
FIG. 6 shows a first counting facility contained in the second block (20)

FIG. 6, as mentioned above, shows details of the facility 210. To count the number of frames, the facility 210 has a frame counter 2101, which has an input 2107 for the overflow indicator ROLL-OVER. After 2430 bytes, i.e., after each frame, the frame counter 2101 is incremented by one count. A reset input 2109 serves to reset the frame counter 2101 to zero after each pointer action incoming from the preceding network node. An output 2116 of the frame counter 2101 is coupled to an input 2110 of an adder 2102 and to an input 2107 of a FIFO memory 2105. This memory 2105 stores the last K-1 counts of the frame counter 2101. A further input 2115 of the memory 2105 is connected to an output 2117 of an address counter 2106, which is incremented modulo (K-1) for each pointer action arriving at in put 2108. Output 2117 supplies input 2115 wit h the address, in memory 2105, of the oldest stored frame count from the frame counter 2101. The contents of that address are supplied via an output 2118 to an input 2112 of a subtracter 2103.

When a pointer action arrives at input 2108, the adder 2102 adds the input 2110, which is the output 2116 of the frame counter 2101, and the input 2111, which is the number of frames $\Sigma F$ between the previous K incoming pointer actions. Input 2111 is supplied by output 2114 of memory 2104. This sum from adder 2102 is then supplied via an output 2119 to an input 2121 of the subtracter 2103. In this subtracter 2103, the contents of the read/write, address of the memory 2105 are subtracted from the sum received from the adder 2102. An output 2120 of the subtracter 2103 is then coupled to an input 2113 of a memory device 2104 which stores the number of frames between the incoming pointer actions. The FIFO memory 2105 then stores input 2107 in the address pointed to by input 2115. Details of the facility 220, whose structure corresponds to that of FIG. 6, are shown in FIG. 7. The facility 220 contains an adder 2202 with two inputs 2209,2210 and an output, a subtracter 2203 with two inputs 2214, 2215 and an output, a memory device 2204 with an input 2216 and an output 2217, a memory 2205 (FIFO memory) with two inputs 2211, 2212 and an output, and an address counter 2206 with an input 2213 and an output.

A counter 2201 has an input 2207 for incoming positive pointer actions, an input 2208 for incoming negative pointer actions, and an output coupled to the input 2210 of the adder 2202 and to the input 2211 of the memory 2205. This counter 2201 counts the type of incoming pointer actions, i.e., the counter is incremented by one count on each incoming positive pointer action, and decremented by one count on each incoming negative pointer action.

The memory device 2204, which is connected to the subtracter 2203, stores the number and type of the last incoming pointer actions, ΣP.

The quantities ΣP and ΣF calculated in FIGS. 6 and 7 are fed to the facility 230 of FIG. 5 for calculating the correction factor LEAK, the quantity ΣF being supplied to an input 280, which is the input of the divider 2301 shown in FIG. 8, and the quantity ΣP being supplied to an input 270 of this divider. The output of the divider 2301 is applied to an input 2307 of a multiplier 2302 which multiplies it by a constant value THRESHOLD FACTOR applied to an input 2308. The result of this multiplication is fed to an input 2306 of a further multiplier 2303.

A further input 2305 of the multiplier 2303 is supplied with a factor corresponding to the number of STM-1 frames between sampling instances $T_i$. If the STM-1 signal has a TU-3, then Ti=4, and if the STM-1 signal has a TU-11 or a TU-12, then Ti=16. The output 295 of the multiplier 2303, which is also the output 295 of the facility 230, provides the correction factor LEAK.

The facility 230, shown in FIG. 8, is an embodiment which implements the following equation for the correction factor LEAK(N) at network node N:

$$\text{LEAK}(N) = T_i \cdot \text{THRESHOLD FACTOR} \cdot \frac{\Sigma P}{\Sigma F}$$

FIG. 9 shows the third block 30 in greater detail. This block contains a comparator 301 for the upper threshold U_THRESH, a comparator 302 for the lower threshold L_THRESH, a register 304, and an OR gate 303. Each of the two comparators 301, 302 is supplied, via a respective input 309, 307, with the constant value THRESHOLD FACTOR and, via a respective input 310a, 310b, with the control value OFFSET. These comparators 301, 302 thus compare the control value OFFSET with the upper and lower thresholds U_THRESH, L_THRESH. If, at the sampling instant $T_i$, the control value OFFSET is greater than the upper threshold U_THRESH, an output 314 of the comparator 301 will be in the 1 state, i.e., a negative pointer action will be initiated.

If, at the sampling instant $T_i$, the control value OFFSET is less than the lower threshold L_THRESH, an output 315 of the comparator 302 will be in the 1 state, i.e., a positive pointer action will be initiated. An input 312 of the OR gate 303 is connected to the output 314 of the comparator 301, and an input 313 of the OR gate 303 is connected to the output 315 of the comparator 302. An output of the OR gate, which is coupled to an input 305 of the register 304, is in the 1 state when one of the two inputs 312, 313 is in the 1 state. A case where both inputs 312, 313 are in the 1 state must be avoided.

A further input 316 of the register 304 is connected to the output 315 of the comparator 302. The register 304 stores the type of the last pointer action. After each new pointer action, the type of that pointer action is delivered at an output of the register 304, i.e., the state of the output is 1 if that pointer action was a positive action, and 0 if that pointer action was a negative one. The output of the register 304 is coupled to an input 306 of the comparator 302 and to an input 311 of the comparator 301.

FIGS. 10 and 11 show details of the comparators 301, 302. Since these comparators 301, 302 are identical in construction, their construction will only be described with reference to FIG. 10. Reference characters relating to FIG. 11 will be given in parentheses. An output of a memory device (register) 3011 (3021) is coupled to an input 30110 (30213) of an adder 3012 (3022) (modulo 2430) and to an input 30113 (30211) of a subtracter 3013 (3023) (modulo 2430). A further input 309a (307a) of the adder 3012 (3022) and a further input 309b (307b) of the subtracter 3013 (3023) are supplied with the constant value THRESHOLD FACTOR. The adder 3012 (3022) is coupled to an input 3019 (3029) of a multiplexer 3014 (3024), and the subtracter 3013 (3023) is coupled to an input 3018 (3028) of the multiplexer 3014 (3024).

An input 311 (306) of the multiplexer 3014 (3024) is supplied with the type of the most recent pointer action. The multiplexer 3014 (3024) will select the sum of the adder 3012 (3022), i.e., it will transfer the sum to its output, if that pointer action was a negative action. Otherwise, i.e., if that pointer action was a positive action, the result of the subtraction performed by the subtracter 3013 (3023) will be selected. The output of the multiplexer 3014 (3024) is coupled to an input 30115 (30215) of the memory device 3011 (3021) and to an input 3016 (3026) of a comparator 3015 (3025). A further input 310a (310b) of the comparator 3015 (3025) is supplied with the control value OFFSET. The output 314 (315) of the comparator 3015 (3025), which is also the output of the third block 30, is in the 1 state when the control value OFFSET in greater (FIG. 11: less) than the value coming from the output of the multiplexer 3014 (3024).

In FIG. 10, the memory device 3011 stores the upper threshold, which is updated on every pointer action arriving at an input 30114. In FIG. 11, the memory device 3021 stores the lower threshold which is updated on every pointer action ariving at an input 30214. For example, on each negative pointer action, the value output from multiplexer 3014 is written into the memory device 3011. The adder 3012 then increments the updated upper threshold by the constant value THRESHOLD FACTOR, and the subtracter 3013 decreases it by the constant value THRESHOLD FACTOR. The multiplexer 3014 passes the value from the adder 3012 to the comparator input 3016. Simultaneously, in FIG. 11, the value output from multiplexer 3024 is written into the memory device 3021. The adder 3022 then increments the updated lower threshold by the constant value THRESHOLD FACTOR, and the subtracter 3023 decreases it by the constant value THRESHOLD FACTOR. The multiplexer 3024 passes the value from the adder 3022 to the comparator input 3026.

The operation of the justification device, the pointer processor, will now be described with reference to an STM-1 signal, which has a bit rate of 155,520 kbit/s. The frame bytes are transmitted at a rate of 19.44 MHz.

The counter 101 of network node N is controlled by the clock from the preceding network node N-1, which is derived from an incoming STM-1 signal, and it is incremented by one count on each incoming frame byte (modulo 2430). The counter 102 of node N is controlled by the internal clock of node N, and it is incremented by one count on each outgoing frame byte (modulo 2430).

In network node N, the difference $\Delta_i$ between the counts of the counters 101, 102 is formed. If the clock rate derived from the incoming STM-1 signal is higher than the internal clock rate of the network node N, frame bytes of a virtual container, such as VC-4, are arriving faster than such VC-4 bytes are being transmitted. As a result, the counter 101 is incremented faster than the counter 102, so that the difference value $\Delta_i$ becomes greater. If the internal clock rate is higher, the difference value $\Delta_i$ will become smaller.

To decide when a pointer action has to be generated, the pointer processor according to the invention uses the result of a comparison between the control value OFFSET and the thresholds U_THRESH, L_THRESH. This comparison is also used to determine the type of the respective pointer action. In one embodiment of the invention, after each pointer action, the thresholds U_THRESH, L_THRESH are changed by a constant value, the THRESHOLD FACTOR, which is dependent on the type of tributary unit TU.

For the TU-3 case, the THRESHOLD FACTOR is 270/85; for the TU-11 case, the THRESHOLD FACTOR is 2430/26; and for the TU-12 case, the THRESHOLD FACTOR is 2430/35.

With the aid of this THRESHOLD FACTOR, the generated pointer actions are evenly distributed if there are no incoming pointer actions. This means for the TU-11 case, for example, that during the time required for the phase offset between the input and output STM-1 frames to change by one entire STM-1 frame that there are 26 evenly spaced pointer actions. The next two paragraphs explain how this invention produces evenly distributed outgoing pointer when there are incoming pointers.

To accomplish this, in the network node being considered, N, the correction factor LEAK is calculated at each sampling instant $T_i$ and added to the change $\Delta_i-\Delta_{i-1}$ in the difference value $\Delta_i$. This sum is added to the previously stored value of OFFSET, i.e., OFFSET=[OFFSET+($\Delta_i-\Delta_{i-1}$)+LEAK]. OFFSET may be set at an initial value, e.g., zero. Thus, the change $\Delta_i-\Delta_{i-1}$ in the difference value $\Delta_i$ is corrected by the correction factor LEAK. The correction factor LEAK depends, inter alia, on the number of frames counted during the time between two successive incoming pointer actions and on the number and type of the last K incoming pointer actions. This information on the incoming pointer actions is derived in the network node from the incoming STM-1 signal, namely by evaluating the H1 and H2 pointer bytes of an incoming frame.

An SDH transmission system with three network nodes 1, 2, and 3 has been assumed by way of example, with nodes 2 and 3 ideally having a clock offset of 0 ppm and the clock of node 1 having a positive offset. The pointer processor generates evenly distributed negative pointer actions in node 2. These negative pointer actions raise the filling level of the memory device provided in node 3 for the virtual container VC. Assuming that the clocks of nodes 2 and 3 are synchronous, the difference value $\Delta_i$ does not change, i.e., $\Delta_i-\Delta_{i-1}=0$. However, the pointer processor prevents the memory device in node 3 from overflowing. Through the quotient $\Sigma P/\Sigma F$, the average spacing of the incoming pointer actions is calculated in node 3. To generate evenly spaced pointer actions transmitted by node 3, the control value OFFSET is changed regularly by the correction factor LEAK.

We claim:

1. A synchronous digital transmission system comprising:
a plurality of network nodes, each network node operating at a respective fixed internal clock rate,
each network node having a justification device for adapting an incoming signal to the respective fixed internal clock rate thereof by positive or negative justification actions, and
each network node having at least one memory device which, under control of the justification device, stores payload bytes of a frame of the incoming signal and outputs the payload bytes at the internal clock rate of the network node, characterized in that
the justification device has first means (10) for counting incoming and outgoing frame bytes and calculating therefrom, at sampling instants ($T_i$), an instantaneous difference value ($\Delta_i$) between counts of incoming frame bytes to be stored and counts of outgoing frame bytes to be read, and determining an instantaneous differential value ($\Delta_i-\Delta_{i-1}$) between the instantaneous difference value ($\Delta_i$) and a delayed difference value ($\Delta_i$) stored in a storage means,
the justification device has second means (20) for calculating a differential control value (OFFSET) which is dependent on the instantaneous differential value ($\Delta_i-\Delta_{i-1}$) and on a correction factor (LEAK), and
the justification device has third means (30) for comparing, at the sampling instants ($T_i$), the differential control value (OFFSET) with an upper threshold (U_THRESH) and a lower threshold (L_THRESH), for initiating a positive justification action if the differential control value (OFFSET) is less than the lower threshold (L_THRESH), and for initiating a negative justification action if the differential control value (OFFSET) is greater than the upper threshold (U_THRESH).

2. A justification device for a network node contained in a synchronous digital transmission system, said justification device adapting an incoming signal to an internal clock rate of the network node by positive or negative justification actions, so that a signal transmitted by the network node has the internal clock rate of the network node, characterized in that
the justification device has first means (10) for counting frame bytes of the incoming signal and frame bytes of the transmitted signal and for calculating therefrom, at sampling instants ($T_i$), an instantaneous difference value ($\Delta_i$) between counts of incoming frame bytes to be stored and counts of outgoing frame bytes to be read, and determining an instantaneous differential value ($\Delta_i-\Delta_{i-1}$) between the instantaneous difference value ($\Delta_i$) and a delayed difference value ($\Delta_{i-1}$) stored in a storage means,
the justification device has second means (20) for calculating a differential control value (OFFSET) which is dependent on the instantaneous differential value ($\Delta_i-\Delta_{i-1}$) and on a correction factor (LEAK), and
the justification device has third means (30) for comparing, at the sampling instants ($T_i$), the differential control value (OFFSET) with an upper threshold (U_THRESH) and a lower threshold (L_THRESH), for initiating a positive justification action if the differential control value (OFFSET) is less than the lower threshold (L_THRESH), and for initiating a negative justification action if the differential control value (OFFSET) is greater than the upper threshold (U_THRESH).

3. A justification device as claimed in claim 2, characterized in that the justification device decreases the two thresholds (U_THRESH, L_THRESH) by a constant value after each positive justification action, and increases said thresholds by the constant value after each negative justification action.

4. A justification device as claimed in claim 2, characterized in that, if the thresholds (U_THRESH, L_THRESH) are constant, the justification device increases the control value (OFFSET) by a constant value after each positive justification action, and decreases said control value (OFFSET) by the constant value after each negative justification action.

5. A method of initiating justification actions in a synchronous digital transmission system,
   wherein each network node has at least one justification device that initiates positive or negative justification actions,
   wherein a memory device stores payload bytes of a frame of an incoming signal at a clock rate of a preceding network node, and
   wherein the payload bytes are output from the memory device at a respective internal clock rate of each network node, so that a signal transmitted by each network node has the respective internal clock rate thereof, characterized in that
   first means (10) counts the frame bytes of the incoming signal and the frame bytes of the transmitted signal to calculate therefrom, at sampling instants ($T_i$), an instantaneous difference value ($\Delta_i$) between counts of incoming frame bytes to be stored and counts of outgoing frame bytes to be read, and determining an instantaneous differential value ($\Delta_i - \Delta_{i-1}$) between the instantaneous difference value ($\Delta_i$) and a delayed difference value ($\Delta_{i-1}$) stored in a storage means,
   second means (20) calculates a differential control value (OFFSET) which is dependent on the instantaneous differential value ($\Delta_i - \Delta_{i-1}$) and on a correction factor (LEAK), and
   at the sampling instants ($T_i$), third means (30) compares the differential control value (OFFSET) with an upper threshold (U_THRESH) and a lower threshold (L_THRESH) so as to initiate a positive justification action if the differential control value (OFFSET) is less than the lower threshold (L_THRESH), and to initiate a negative justification action if the differential control value (OFFSET) is greater than the upper threshold (U_THRESH).

6. A method of initiating justification actions as claimed in claim 5, characterized in that the two threshold values (U_THRESH, L_THRESH) are decreased by a constant value after each positive justification action, and increased by the constant value after each negative justification action.

7. A method of initiating justification actions as claimed in claim 5, characterized in that, if constant threshold values (U_THRESH, L_THRESH) are used, the control value (OFFSET) is increased after each positive justification action, and decreased by the constant value after each negative justification action.

8. A synchronous digital transmission system as claimed in claim 1, characterized in that the justification device decreases the two thresholds (U_THRESH, L_THRESH) by a constant value after each positive justification action, and increases said thresholds by the constant value after each negative justification action.

9. A synchronous digital transmission system as claimed in claim 1, characterized in that, if the thresholds (U_THRESH, L_THRESH) are constant, the justification device increases the control value (OFFSET) by a constant value after each positive justification action, and decreases said control value (OFFSET) by the constant value after each negative justification action.

* * * * *